(No Model.)

S. P. BURGESS.
ROACH TRAP.

No. 529,109. Patented Nov. 13, 1894.

WITNESSES:

INVENTOR
Silas P. Burgess

UNITED STATES PATENT OFFICE.

SILAS P. BURGESS, OF SPRINGFIELD, MASSACHUSETTS.

ROACH-TRAP.

SPECIFICATION forming part of Letters Patent No. 529,109, dated November 13, 1894.

Application filed December 30, 1893. Serial No. 495,255. (No model.)

*To all whom it may concern:*

Be it known that I, SILAS P. BURGESS, of Springfield, Hampden county, Massachusetts, have invented Improvements in Roach-Traps, of which the following is a specification.

My invention consists, primarily, in the combination with a suitable box-like structure of a series of tubes for affording entrance to within said box, and a removable, or detachable cover normally covering said box, and a bait in said box, substantially as hereinafter described.

My invention further consists in the combination with a box having its exterior surface of paper, of tubes having a paper surface on their interior, and entering to within the said box above the bottom thereof, and a cover that can be opened, or be removed, substantially as hereinafter described.

My invention still further consists in certain combinations, and sub-combinations, to be hereinafter described.

Figure 1:
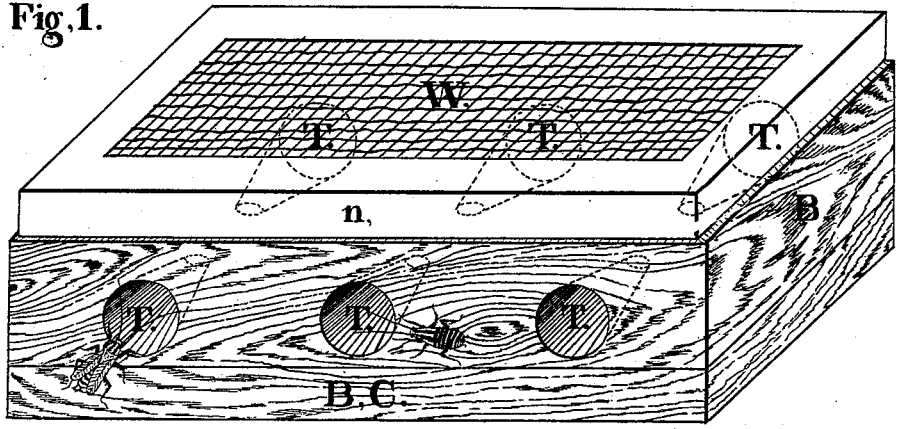
Figure 2:
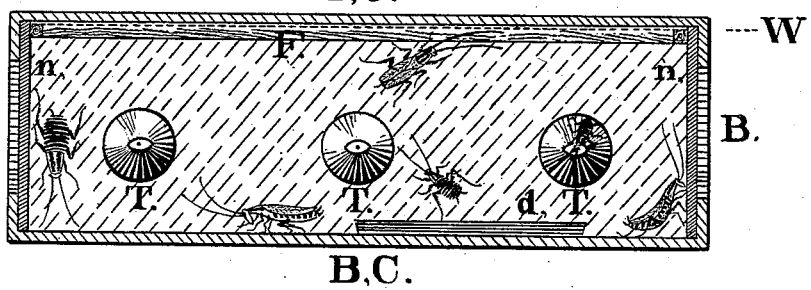
Figure 3:
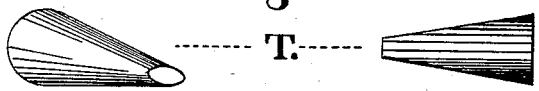

In the accompanying drawings Figure 1, is a view in perspective of a roach trap arranged according to my invention. Fig. 2, shows the same in cross-section, side elevation. Fig. 3, shows details of said trap.

Referring to the drawings, B. represents a box of paper, wood, paste board, or other suitable material having a bottom that is removable, and a cover T C. that lifts up or is removable, and preferably covered upon its exterior with a surface of paper.

Tubes T. T. T. of stiff paper or other suitable material, make openings into the box, and are shown tapered toward the interior of the box, and are arranged to open within the box at a point above the bottom of the box with oval shaped openings.

A wire screen W. is shown over the top of the box, and under the cover T C, the cover being removed in the view given in Fig. 1. and the neck of the box, to receive the cover being represented at *n*.

In Fig. 2. a frame F. is shown to strengthen a box of cardboard, or paper, and a dish *d*. is shown to receive the bait used to attract the roaches; or the bait can be put into the box itself.

Fig. 3. more distinctly shows the preferred form of tubes T.

The tubes T. T. T. are secured in the sides, or ends of the box-like structure B. by glue, or otherwise, and, as before stated open into the box at a point above the bottom of the box. This feature is of advantage, as practice has demonstrated; for the roaches having entered the box, and dropped off from the tubes, fail to find their way out again when the tubes are placed above the bottom, as shown.

When paper is used as the material in making the traps, of the kind described, an advantage is gained as compared with the material heretofore used, as the cost of making is so small that a new trap can be substituted for one that has been used before it has become very undesirable to have about, and as this material is so easily destroyed by fire the trap with its contents can be burned in the fire of an ordinary stove.

In practice it has been discovered that the roaches are more inclined to go about on a paper surface than any other, and that they enter more freely in tubes made of paper, or lined with paper and through slots or oval shaped openings than round holes; and that they are less liable to re-enter a tube that is tapered to where it opens into the box.

In Fig. 2. the top cover T C. is shown as removable to allow of inspecting the interior of the box, through the wire screen; and the bottom C. is adapted to be removed for the purpose of emptying the contents of the box.

Instead of a screen W. a glass can be used, and the glass, or screen can be removably attached so as to adapt the trap to be emptied of its contents from the top.

What I claim is—

1. An insect trap made of paper, having an exterior surface of paper, and provided with conical tubes penetrating to within said box, a transparent top, and a cover for said top, substantially as described.

2. As a new article of manufacture an insect trap comprising a paper box provided with a series of truncated conical tubes of the same material projecting within the said box.

SILAS P. BURGESS.

Witnesses:
F. F. GESNER,
MARK S. STUNTON.